(12) United States Patent
Yamasaki

(10) Patent No.: US 9,820,258 B2
(45) Date of Patent: Nov. 14, 2017

(54) ELECTRONIC APPARATUS

(71) Applicant: KYOCERA CORPORATION, Kyoto (JP)

(72) Inventor: Saki Yamasaki, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/247,692

(22) Filed: Aug. 25, 2016

(65) Prior Publication Data
US 2017/0064766 A1 Mar. 2, 2017

(30) Foreign Application Priority Data

Aug. 28, 2015 (JP) ................................. 2015-168966

(51) Int. Cl.
| | |
|---|---|
| H04M 3/42 | (2006.01) |
| H04W 68/00 | (2009.01) |
| H04L 12/24 | (2006.01) |
| H04W 76/06 | (2009.01) |
| H04M 1/725 | (2006.01) |
| H04L 29/06 | (2006.01) |
| H04W 88/02 | (2009.01) |
| H04W 76/02 | (2009.01) |

(52) U.S. Cl.
CPC .......... *H04W 68/005* (2013.01); *H04L 41/22* (2013.01); *H04M 1/72519* (2013.01); *H04W 76/06* (2013.01); *H04M 1/72583* (2013.01); *H04W 76/028* (2013.01); *H04W 88/02* (2013.01)

(58) Field of Classification Search
CPC ........ H04M 3/48; H04W 76/045; H04L 41/22
USPC .................................. 455/414.1; 379/210.01
See application file for complete search history.

(56) References Cited

U.S. PATENT DOCUMENTS

| | | | |
|---|---|---|---|
| 2011/0230196 A1* | 9/2011 | Tal ..................... | H04M 3/42374 455/450 |
| 2012/0155629 A1* | 6/2012 | Morken ............ | H04M 3/42195 379/229 |

FOREIGN PATENT DOCUMENTS

JP        2010-278657 A        12/2010

* cited by examiner

*Primary Examiner* — Lee Nguyen
(74) *Attorney, Agent, or Firm* — Duane Morris LLP

(57) ABSTRACT

An electronic apparatus of an aspect of the present disclosure is an electronic apparatus by which a phone call can be made. The electronic apparatus includes a communication unit, an input unit, and at least one processor. The at least one processor is configured to determine whether or not a conversation held in the phone call has been terminated based on at least one of the audio signal transmitted or received by the communication unit during the phone call and an operation of disconnecting the phone call performed through the input unit. The at least one processor is configured to determine whether or not the conversation has been resumed based on the audio signal received by the communication unit from the other party of the phone call after determining that the conversation has been terminated.

10 Claims, 16 Drawing Sheets

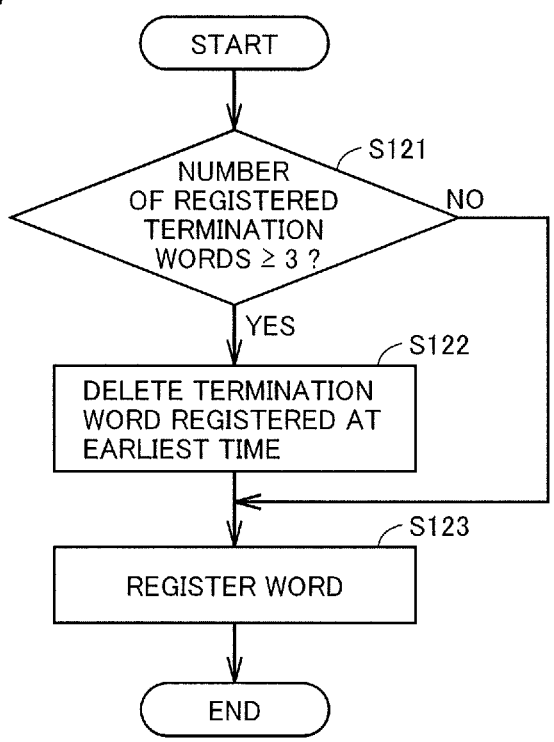

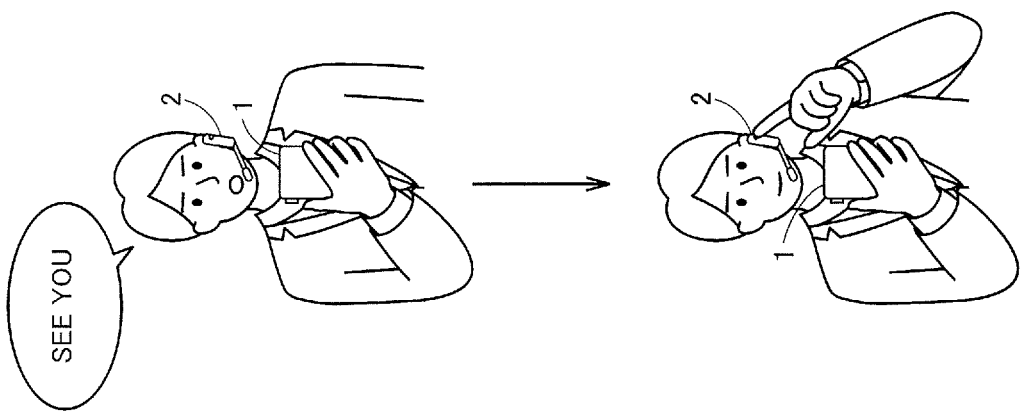
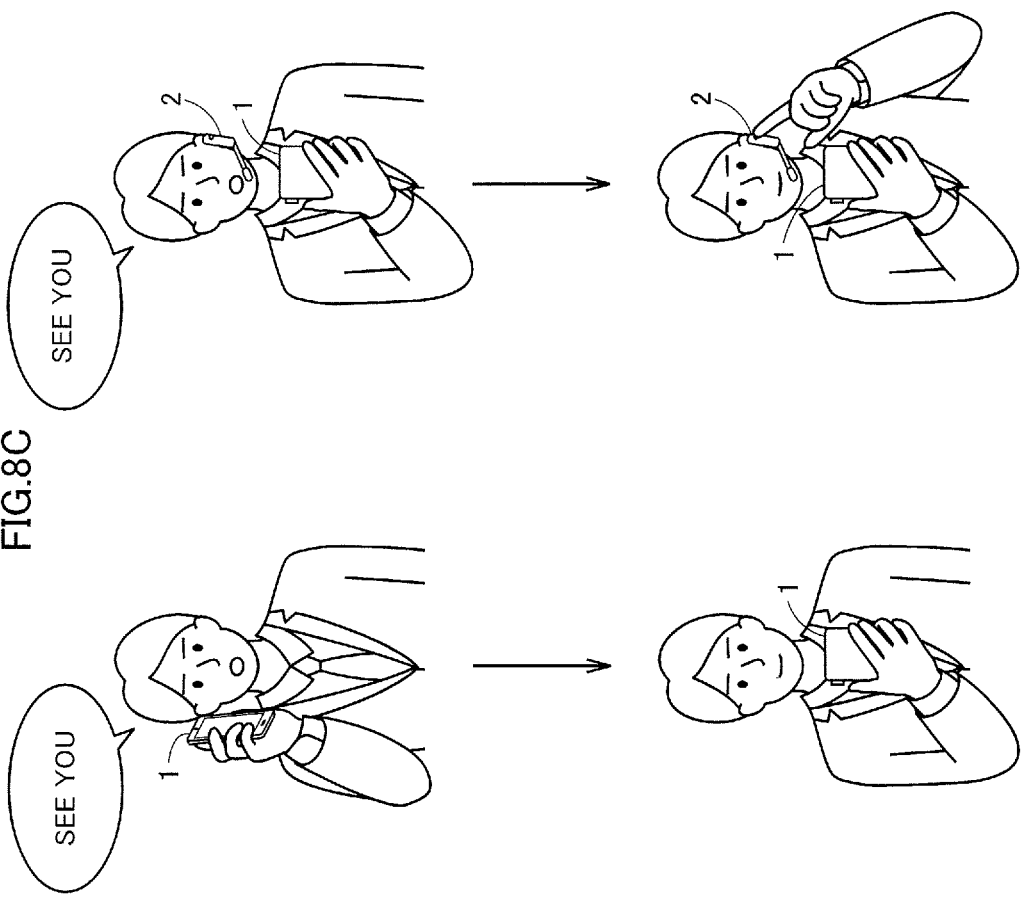
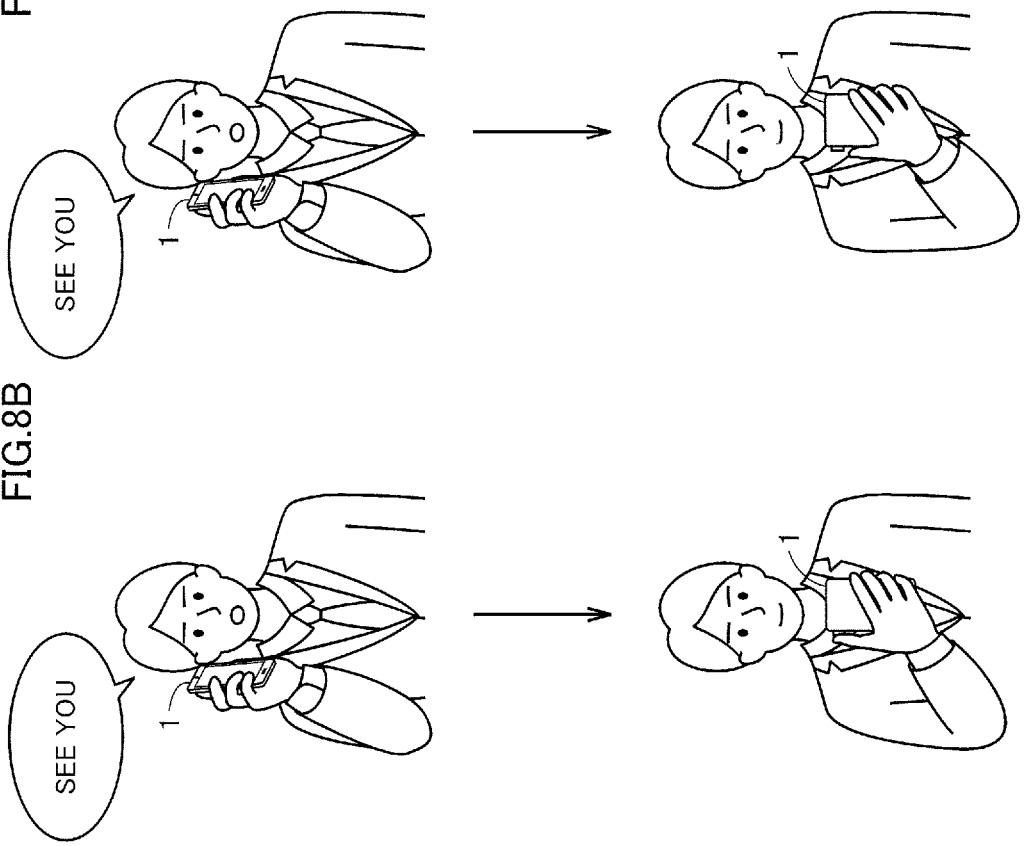

ELECTRONIC APPARATUS

CROSS-REFERENCE TO RELATED APPLICATION

The present application claims priority under 35 U.S.C. §119 to Japanese Patent Application No. 2015-168966, filed on Aug. 28, 2015, entitled "Electronic Apparatus." The content of which is incorporated by reference herein in its entirety.

FIELD

The present disclosure relates to an electronic apparatus by which a phone call (a conversation with the other party with which communication has been established) can be made.

BACKGROUND

An electronic apparatus which causes a display to display call-related information, such as the other party or the duration of a phone call, is conventionally known. For example, a phone device which, when a new call is received during a phone call, causes a display to display a screen for prompting for an instruction as to which call is to be selected is known.

SUMMARY

An electronic apparatus of an aspect of the present disclosure is an electronic apparatus by which a phone call can be made. The electronic apparatus includes a communication unit, an input unit, and at least one processor. The communication unit is configured to transmit an audio signal of a user to another party of the phone call and to receive an audio signal from the other party of the phone call. The input unit is configured to allow the user to perform an input for operating the electronic apparatus. The at least one processor is configured to determine whether or not a conversation held in the phone call has been terminated based on at least one of the audio signal transmitted or received by the communication unit during the phone call and an operation of disconnecting the phone call performed through the input unit. The at least one processor is configured to determine whether or not the conversation has been resumed based on the audio signal received by the communication unit from the other party of the phone call after determining that the conversation has been terminated.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 shows an example of a flowchart for describing an example of a process for automatic learning.

FIG. 8A shows an example of a timing at which screen return is performed in response to a power button shown in FIG. 1 being pressed.

FIG. 8B shows an example of a timing at which screen return is performed in response to a proximity sensor shown in FIG. 2 detecting that a smartphone has been held away from the ear.

FIG. 8C shows an example of a timing at which screen return is performed in response to a disconnection button of a headset being pressed.

DETAILED DESCRIPTION

Figure 1:
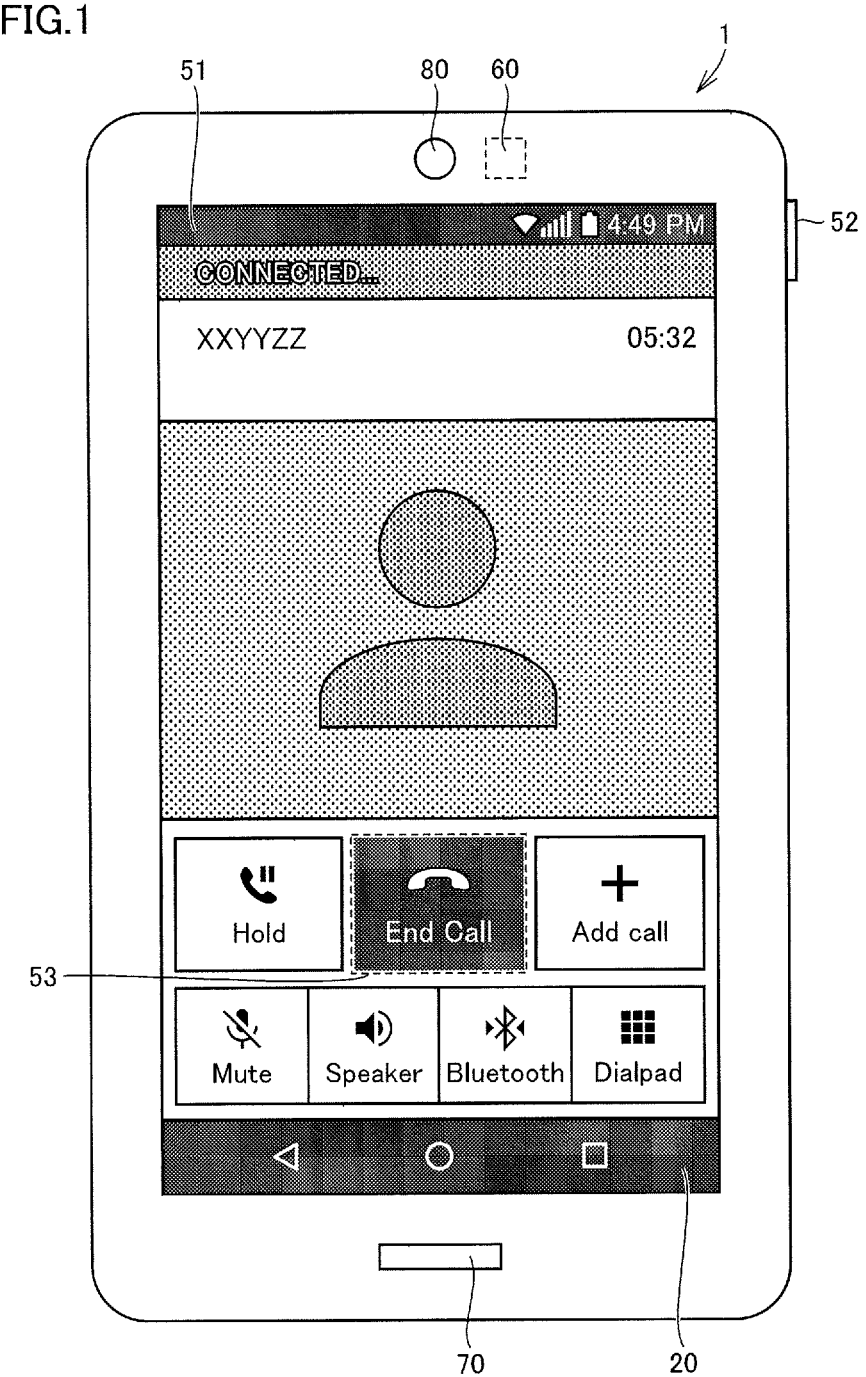
FIG. 1 is a front view of an example of a smartphone which is an electronic apparatus according to an embodiment.

Hereinafter, embodiments of the present disclosure will be described in detail with reference to the drawings. In the drawings, the same or corresponding portions have the same reference characters allotted, and description thereof will not be repeated.

The term "unit" as used herein refers to known structures such as hardware, firmware, non-transitory computer-readable media that store computer-executable instructions, or any combination of these elements, for performing the associated functions described herein. Additionally, various units can be discrete units; however, as would be apparent to one of ordinary skill in the art, two or more units may be combined to form a single unit that performs the associated functions according to various embodiments of the invention. Conversely, a single unit may be divided into two or more units that perform respective associated functions according to various embodiments of the invention.

In the following embodiments, a smartphone will be described as an electronic apparatus according to an embodiment by way of example. The electronic apparatus according to an embodiment is not limited to a smartphone, but any electronic apparatus by which a phone call can be made may be adopted. The electronic apparatus according to an embodiment may be, for example, a tablet PC (Personal Computer), a notebook PC, or a SmartWatch. The electronic apparatus according to an embodiment is not limited to a mobile electronic apparatus, but may be a stationary type phone or a desktop type PC.

A smartphone according to an embodiment adopts CSFB (Circuit Switched FallBack) by which data communication can be made via LTE (Long Term Evolution), and when making a voice call, the communication system is switched to a circuit switching system such as 3G. Although CDMA (Code Division Multiple Access) or UMTS (Universal Mobile Telecommunications System) can be adopted as the circuit switching system, the following embodiments will describe an example in the case of CDMA.

In the electronic apparatus according to an embodiment, CSFB is not indispensable. It may be an electronic apparatus adopting VoLTE (Voice over LTE) or SVLTE (Simultaneous Voice and LTE), for example.

FIG. 1 is a front view of an example of a smartphone 1 which is an electronic apparatus according to an embodiment. As shown in FIG. 1, smartphone 1 includes a speaker 80 at the longitudinally upper part of a main body, a microphone 70 at the longitudinally lower part of the main body, a display 20 and a touch panel 51 at the center, as well as a power button 52 on a side surface.

Display 20 displays a talking screen. The talking screen may display call-related information, such as the other party or the duration of a phone call. GUIs (Graphical User Interfaces) necessary for a call-related operation, such as holding or disconnection, are displayed. A disconnection button GUI 53 is one of them. A user an disconnect a phone call by touching disconnection button GUI 53. If power button 52 also serves as the call disconnection button, a user can also disconnect a phone call by pressing power button 52.

Figure 2:
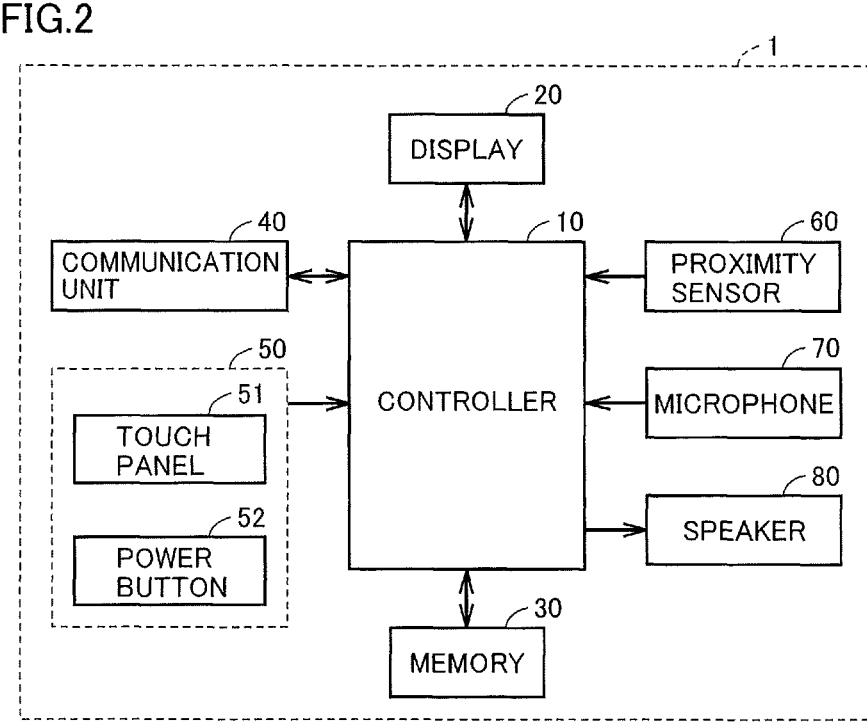
FIG. 2 shows an example of a functional block for describing functions of the smartphone shown in FIG. 1.

FIG. 2 shows an example of a functional block for describing functions of smartphone 1 shown in FIG. 1. As shown in FIG. 2, smartphone 1 includes a controller 10, display 20, a memory 30, a communication unit 40, an input unit 50, a proximity sensor 60, microphone 70, and speaker 80.

Controller 10 can control smartphone 1 in an integrated manner. Controller 10 includes at least one processor not shown. Controller 10 may be at least one processor. In accordance with various embodiments, the at least one processor may be implemented as a single integrated circuit (IC) or as multiple communicatively coupled ICs and/or discrete circuits. It is appreciated that the at least one processor can be implemented in accordance with various known technologies. In one embodiment, the processor includes one or more circuits or units configurable to perform one or more data computing procedures or processes. For example, the processor may include one or more processors, controllers, microprocessors, microcontrollers, application specific integrated circuits (ASICs), digital signal processors, programmable logic devices, field programmable gate arrays, or any combination of these devices or structures, or other. Controller 10 includes a memory device. The memory device includes an SRAM (Static Random Access Memory) or a DRAM (Dynamic Random Access Memory), for example.

Display 20 can perform displaying based on a signal received from controller 10. Display 20 may include a liquid crystal display, a plasma display or an organic electroluminescence display, for example.

Memory 30 can store therein an OS (Operating System) read and executed by controller 10, programs for various applications, as well as various types of data used by those programs. Memory 30 may include a flash memory which is a nonvolatile semiconductor memory or a HDD (Hard Disk Drive) which is a memory device, for example.

Communication unit 40 includes an antenna switch, a duplexer, a power amplifier, a low noise amplifier, and a band pass filter, neither shown. Communication unit 40 can make communication in a communication network of a telecommunications carrier in accordance with the LTE (Long Term Evolution) or CDMA (Code Division Multiple Access) system. Communication unit 40 can process a signal received by the antenna, and can output this signal to controller 10. Controller 10 can output a signal to communication unit 40. Communication unit 40 can transmit the signal output from controller 10. Communication unit 40 can achieve a wireless communication function by WiFi (registered trademark) or Bluetooth (registered trademark), for example.

Input unit 50 can receive a user input, and can transmit a signal based on the input to controller 10. Input unit 50 includes touch panel 51 and power button 52 shown in FIG. 1. A user can perform an input necessary for operating smartphone 1 through input unit 50. For example, a user can perform an operation necessary for disconnecting communication through input unit 50. In various embodiments, input unit 50 may be implemented using any input technology or device known in the art such as, for example, a QWERTY keyboard, a pointing device (e.g., a mouse), a joy stick, a stylus, a touch screen display panel, a key pad, one or more buttons, etc., or any combination of these technologies.

Proximity sensor 60 includes an infrared type proximity sensor, for example. Proximity sensor 60 can detect an object within a predetermined distance therefrom. When an object is detected, proximity sensor 60 can output a detection signal to controller 10. In an embodiment, proximity sensor 60 may be located close to speaker 80. The main object of proximity sensor 60 is to detect whether or not smartphone 1 has been brought close to a user's ear.

Figure 3:
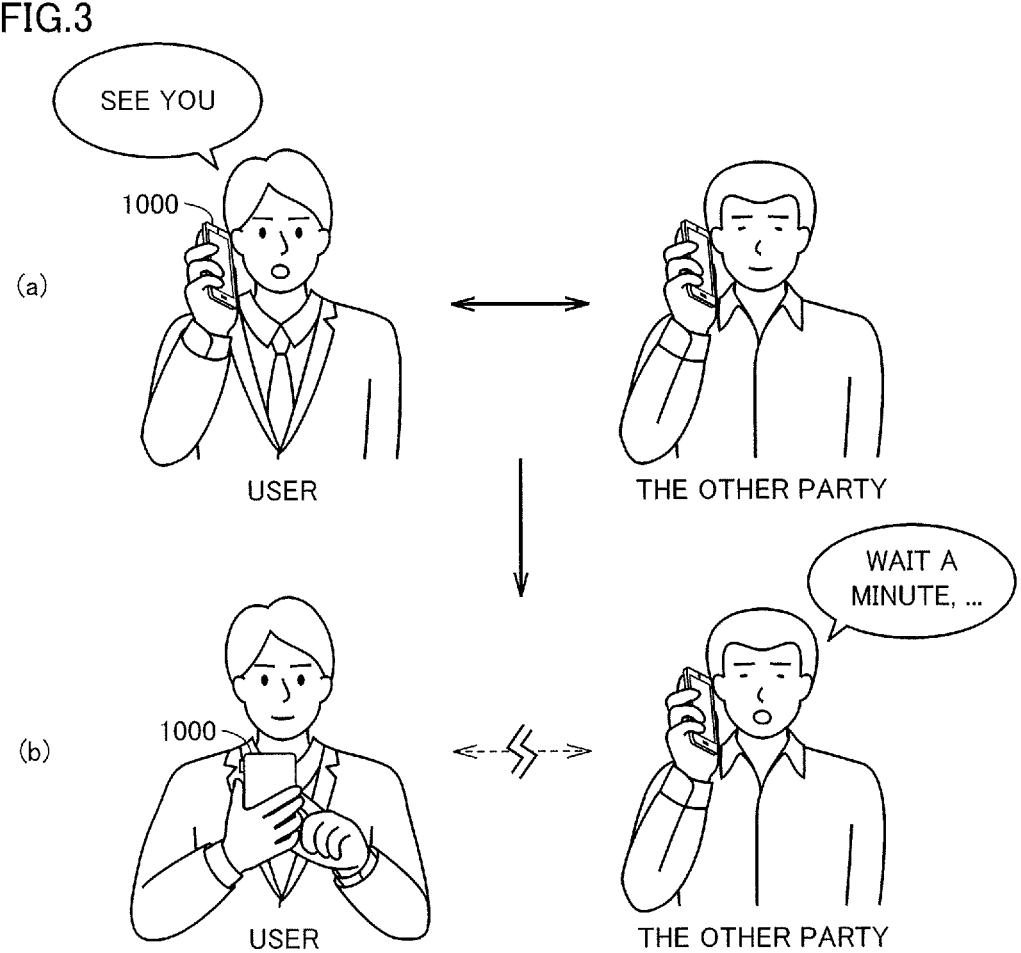
FIG. 3 shows how a user is talking with the other party on a conventional smartphone.

FIG. 3 shows how a user is talking with the other party on a conventional smartphone 1000. As shown in FIG. 3(a), the user says "see you" intending to terminate a conversation. As shown in FIG. 3(b), the other party, having heard that, remembers what he wants to tell the user and begins to say "wait a minute, . . . ". The user performs an operation of disconnecting the phone call without noticing the other party's voice because he has held smartphone 1000 away from his ear, so that the conversation is interrupted.

In order to avoid such interruption of the conversation, it is necessary to notify the user that the other party wishes to resume the conversation.

In smartphone 1 according to an embodiment, when a conversation is terminated, it is possible to determine whether or not the other party wishes to resume the conversation. By detecting that the other party wishes to resume the conversation, a user can easily notice that the other party wishes to resume the conversation.

Figure 4:
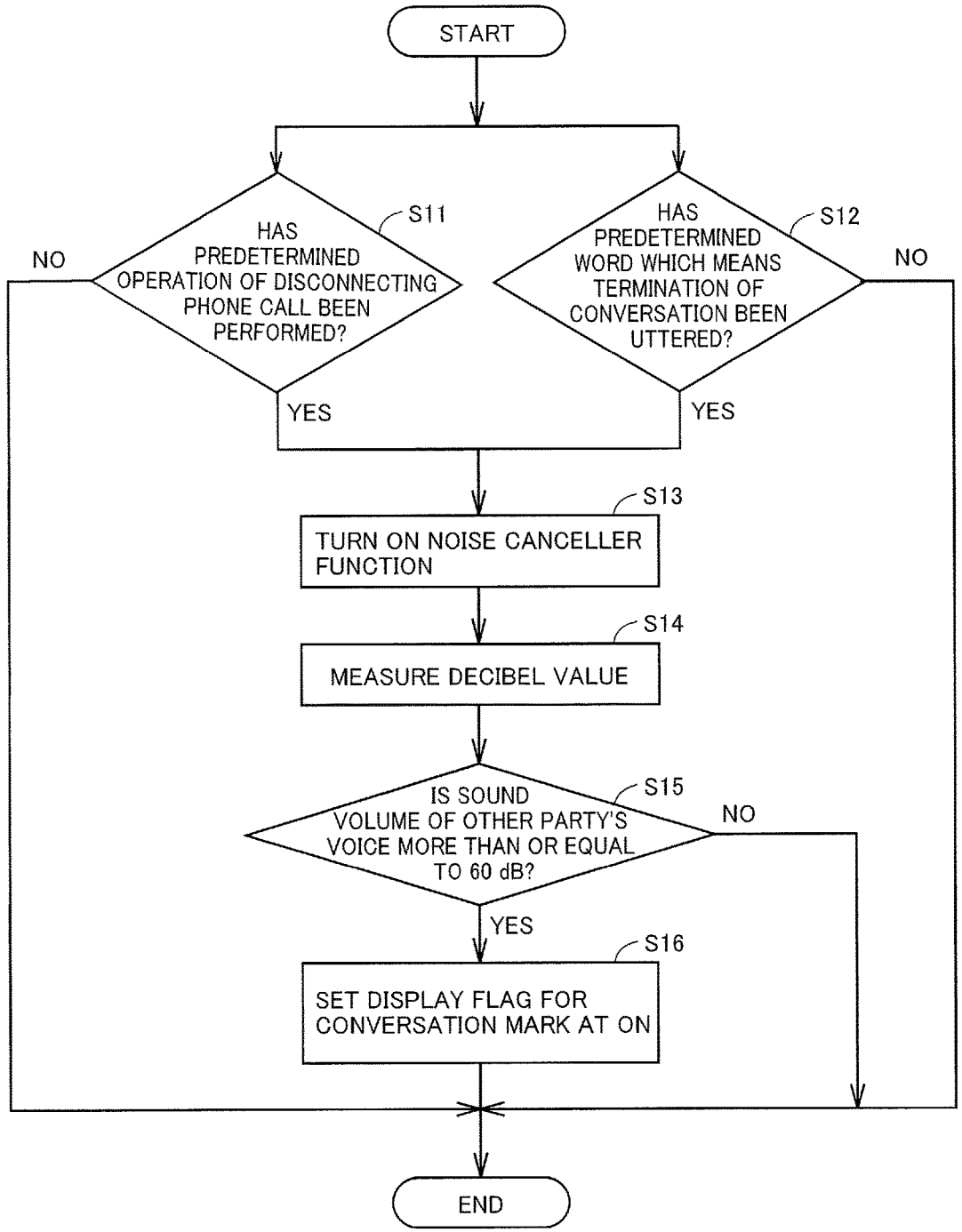
FIG. 4 shows an example of a flowchart for describing a process conducted by a controller shown in FIG. 2 for determining whether or not a conversation has been resumed.

FIG. 4 shows an example of a flowchart for describing a process conducted by controller 10 shown in FIG. 2 for determining whether or not a conversation has been resumed. This process may be performed at predetermined intervals during a phone call. In an embodiment, when a phone call is started, a display flag for the conversation mark may be set at OFF. The conversation mark includes a predetermined image used for notifying that a conversation has been resumed. As shown in FIG. 4, controller 10 can determine whether or not the conversation has been terminated in steps S11 and S12. In step S11, controller 10 can determine whether or not the user has performed a predetermined operation of disconnecting the phone call. The predetermined operation includes a user operation of touching disconnection button GUI 53 shown in FIG. 1 or of pressing power button 52, for example. When the predetermined operation of disconnecting the phone call has been performed (YES in S11), controller 10 can determine that the conversation has been terminated and can proceed the process to step S13. When the predetermined operation of disconnecting the phone call has not been performed (NO in S11), controller 10 can terminate the process.

In step S12, controller 10 can determine whether or not a word uttered by the user or the other party is a word which means termination of the conversation (hereinafter also referred to as a "termination word"). It can be determined whether or not a word uttered by the user or the other party is a termination word, depending on whether or not the word uttered by the user or the other party is included in one or more words registered in memory 30 shown in FIG. 2. How to register a termination word will be described later. When the word uttered by the user or the other party is a termination word (YES in S12), controller 10 can determine that the conversation has been terminated, and can proceed the process to step S13. When the word uttered by the user or the other party is not a termination word (NO in S12), controller 10 can terminate the process.

In step S13, controller 10 can enable a noise canceller function of smartphone 1, and can proceed the process to step S14. With this function, smartphone 1 can remove noise included in the other party's voice. In the next step S14, smartphone 1 can accurately measure the sound volume of the other party's voice by using an audio signal in a frequency band specific to human being's voice.

In step S14, controller 10 can measure the sound volume of the other party's voice during a predetermined time period, and can proceed the process to step S15. In step S15, controller 10 can determine whether or not the sound volume of the other party's voice is more than or equal to 60 dB. When the sound volume of the other party's voice is more than or equal to 60 dB (YES in S15), controller 10 can determine that the conversation has been resumed, and can proceed the process to step S16. In step S16, controller 10 can set the display flag for the conversation mark at ON, and can terminate the process.

When the sound volume of the other party's voice is smaller than 60 dB (NO in S15), controller 10 can terminate the process.

When the user or the other party has uttered a termination word (YES in S12), steps S13 and S14 are performed, and it is determined in S15 that the sound volume of the other party's voice is smaller than 60 dB, the phone call may be maintained. When the predetermined operation of disconnecting the phone call is performed (YES in S11), steps S13 and S14 are performed, and it is determined in S15 that the sound volume of the other party's voice is smaller than 60 dB, the phone call may be automatically disconnected.

A predetermined sound volume used for determining in step S15 whether or not the conversation has been resumed is not limited to 60 dB. This sound volume is desirably determined as appropriate by real machine experiments or simulations, for example.

When display 20 is temporarily off during a phone call for power saving, for example, display 20 can be turned on in response to a predetermined operation to return to the screen shown in FIG. 1. Return of the screen shown in FIG. 1 to display 20 in response to a predetermined operation will hereinafter be briefly called "screen return."

Figure 5:
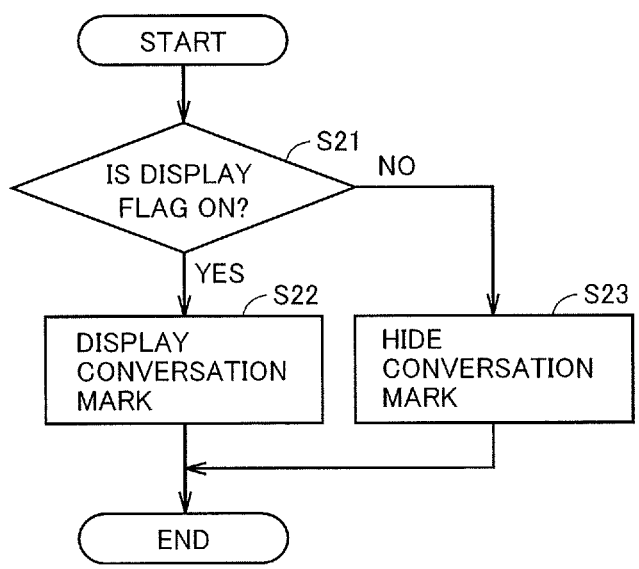
FIG. 5 shows an example of a flowchart for describing a process related to displaying a conversation mark conducted by the controller shown in FIG. 2.

FIG. 5 shows an example of a flowchart for describing a process conducted by controller 10 shown in FIG. 2 when screen return occurs. As shown in FIG. 5, in step S21, controller 10 can determine whether the display flag for the conversation mark is ON or OFF. When the display flag is ON (YES in S21), controller 10 can proceed the process to step S22. In step S22, controller 10 can cause the conversation mark to be displayed, and can terminate the process. When the display flag is off (NO in S21), controller 10 proceeds the process to step S23. In step S23, controller 10 can hide the conversation mark, and can terminate the process.

Figure 6:
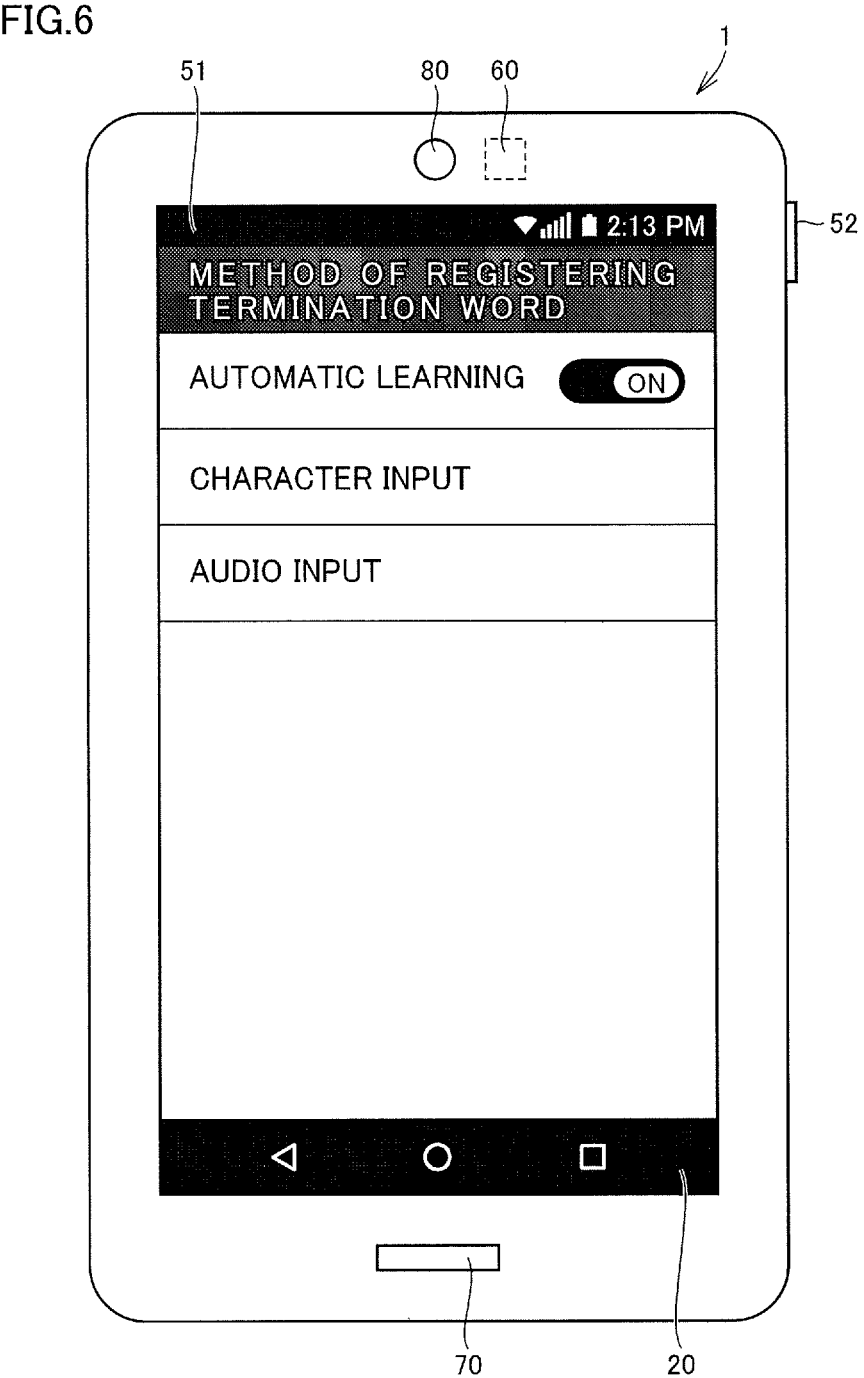
FIG. 6 shows an example of a screen for selecting a method of registering a termination word.

Hereinafter, a method of registering a termination word to be used in step S12 shown in FIG. 4 will be described. FIG. 6 shows an example of a screen for selecting a method of registering a termination word. As shown in FIG. 6, the method of registering a termination word includes character input, audio input and automatic learning, for example. The character input is a method by which a user registers a termination word through input unit 50. The audio input is a method by which a user inputs voice to microphone 70 to register a termination word. The automatic learning is a method of automatically registering a termination word among words uttered during a phone call. The automatic learning has been selected in FIG. 6.

FIG. 7 shows an example of a flowchart for describing an example of a process for the automatic learning. This process may be executed each time when a word is recognized in voice uttered by a user or the other party. As shown in FIG. 7, in step S121, controller 10 can determine whether or not the number of termination words registered in memory 30 is three or more. When the number of registered termination words is smaller than three (NO in S121), controller 10 can proceed the process to step S123. When the number of registered termination words is three or more (YES in S121), controller 10 can proceed the process to step S122. In step S122, controller 10 can delete a termination word registered in memory 30 at the earliest time, and can proceed the process to step S123. In step S123, controller 10 can newly register a recognized word into memory 30 as one of termination words, and can terminate the process.

By performing the process as shown in FIG. 7, three words may be registered into memory 30 as termination words among words uttered by the user or the other party, in the reverse chronological order from the time when the phone call is disconnected. The number of termination words registered in memory 30 is not limited to three.

The automatic learning may be performed collectively after disconnection of a phone call, rather than each time when a word is recognized. In this case, all the words recognized during a phone call, for example, may be stored and analyzed after the phone call is disconnected to thereby determine termination words.

FIGS. 8A to 8C each show an example of a timing at which screen return is performed. FIGS. 8A to 8C assume cases where three words "thank you", "see you" and "bye" have been registered in memory 30 as termination words. As shown in each of FIGS. 8A to 8C, a user says "see you" to the other party. His speech includes "see you" which is one of the termination words. Controller 10 determines that the conversation has been terminated (see S12 in FIG. 4). When the other party speaks with a sound volume of more than or equal to 60 dB wishing to resume the conversation, the display flag for the conversation mark may be turned on (see S15 and S16 shown in FIG. 4).

FIG. 8A shows an example in which screen return is performed in response to power button 52 shown in FIG. 1 being pressed. In this case, power button 52 may also serve as the disconnection button. Screen return may be performed in response to the user pressing power button 52 intending to disconnect the phone call. The process shown in FIG. 5 may be performed to cause display 20 to display the conversation mark in step S22.

FIG. 8B shows an example in which screen return is performed in response to proximity sensor 60 shown in FIG. 2 detecting that smartphone 1 has been held away from the user's ear. When the user wishes to disconnect a phone call, he/she may hold smartphone 1 away from his/her ear intending to look at display 20 on which disconnection button GUI 53 is displayed. In FIG. 8B, screen return may be performed in response to proximity sensor 60 detecting no object and the user holding smartphone 1 away from his/her ear. The process shown in FIG. 5 may be performed to cause display 20 to display the conversation mark in step S22.

FIG. 8C shows an example in which screen return is performed in response to the disconnection button of a headset 2 being pressed. Headset 2 may be connected to smartphone 1 via Bluetooth, for example. Screen return may be performed in response to the user pressing the disconnection button of the headset intending to disconnect the phone call. The process shown in FIG. 5 may be performed to cause display 20 to display the conversation mark in step S22.

Figure 9:
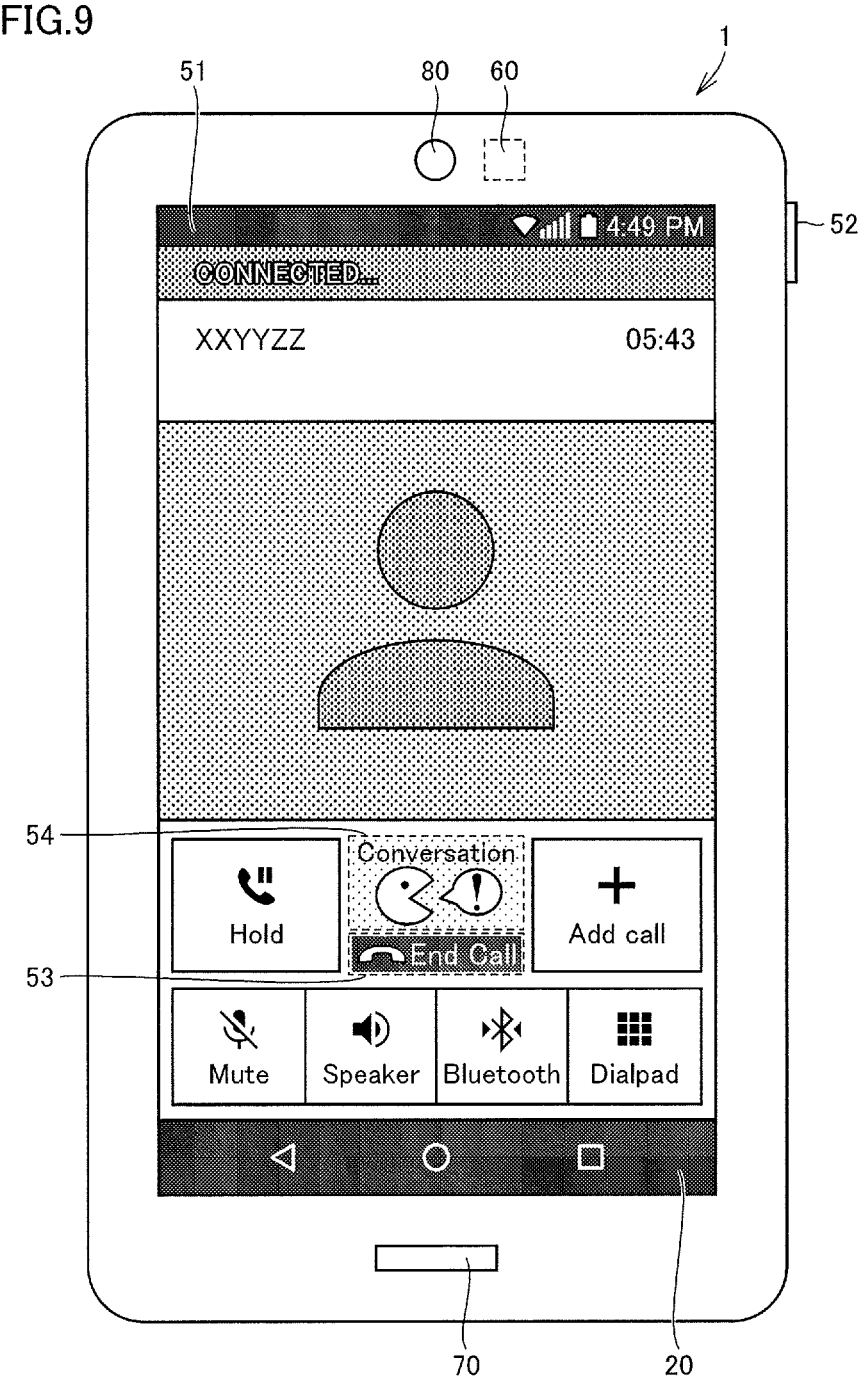
FIG. 9 shows an example of how the controller causes the display to display the conversation mark in order to notify that the conversation has been resumed.

FIG. 9 shows an example of how controller 10 causes display 20 to display a conversation mark 54 in order to notify that the conversation has been resumed. As shown in FIG. 9, conversation mark 54 may be displayed in a display area of disconnection button GUI 53 in FIG. 1. Busy mark 54 may occupy, for example, about ¾ of the display area of disconnection button GUI 53. Disconnection button GUI 53 may be displayed in the remaining area where conversation mark 54 is not displayed in its own display area, on a smaller scale than in FIG. 1.

With conversation mark 54 displayed at a position where disconnection button GUI 53 is usually displayed, a user readily becomes aware of conversation mark 54 when he/she is going to touch disconnection button GUI 53 intending to disconnect a phone call. Since disconnection button GUI 53 is displayed on a smaller scale than usual, it is difficult to touch disconnection button GUI 53 while conversation mark 54 is being displayed. It is possible to reduce the likelihood that disconnection button GUI 53 is touched by mistake when the other party wishes to resume the conversation.

Figure 10:
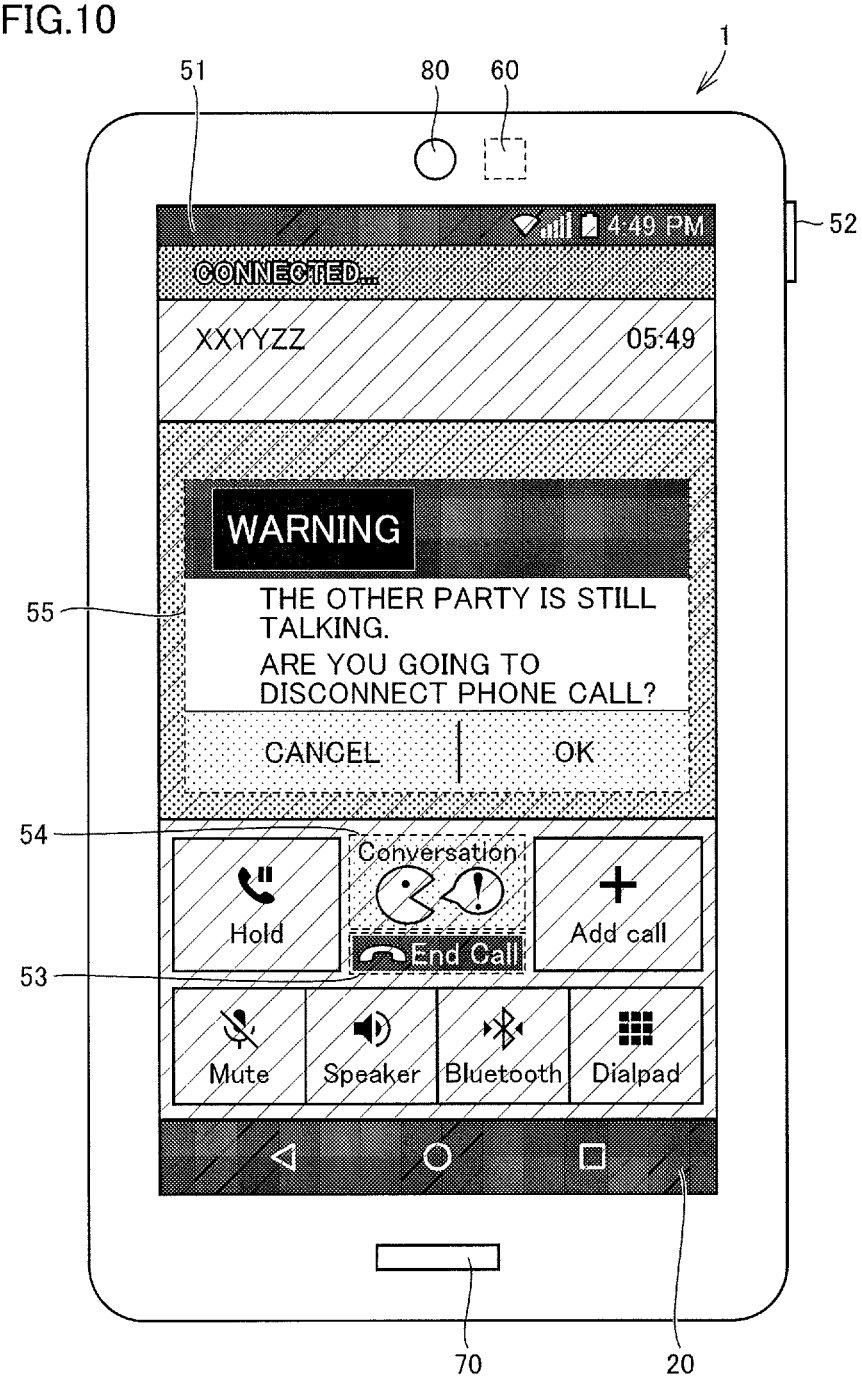
FIG. 10 shows an example of how a warning dialog is displayed on the display.

FIG. 10 shows an example of how a warning dialog 55 is displayed on display 20. As shown in FIG. 10, when a user performs a predetermined operation of disconnecting a phone call after controller 10 determines that the conversation has been resumed, controller 10 can cause display 20 to display warning dialog 55 without disconnecting the phone call. With such warning dialog 55 displayed, it is easier to make a user aware that the conversation has been resumed, for example, when he/she performs an operation of disconnecting the phone call by mistake or when an operation of disconnecting the phone call without becoming aware of the notice that the conversation has been resumed. Warning dialog 55 may be closed when an OK button GUI or a CANCEL button GUI is touched.

Figure 11:
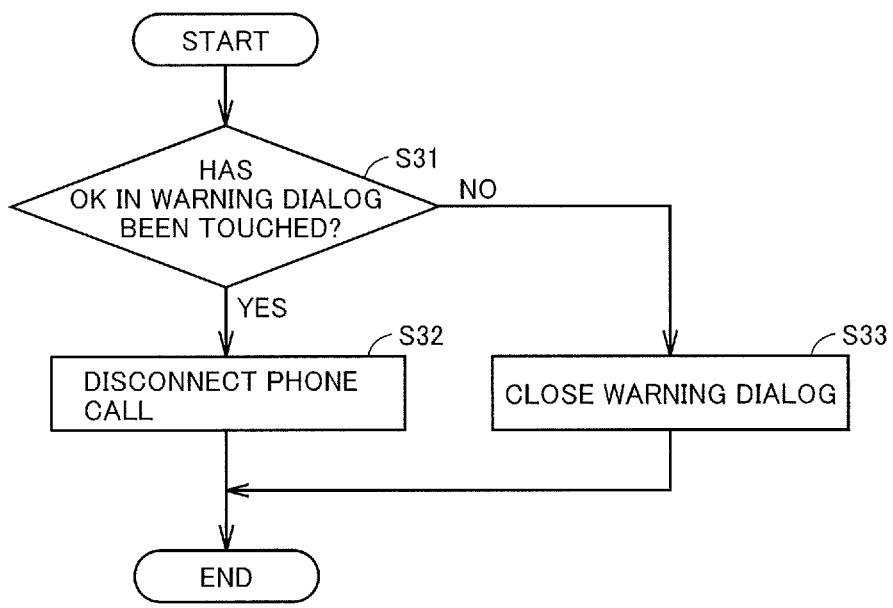
FIG. 11 shows an example of a flowchart for describing a process performed by the controller shown in FIG. 2 when a touch panel is touched with the warning dialog of FIG. 10 being displayed.

FIG. 11 shows an example of a flowchart for describing a process performed by controller 10 shown in FIG. 2 when touch panel 51 is touched with warning dialog 55 of FIG. 10 being displayed. In step S31, controller 10 can determine whether or not the OK button GUI in warning dialog 55 has been touched, as shown in FIG. 11. When the CANCEL button GUI in warning dialog 55 or an area other than warning dialog 55 in touch panel 51 has been touched (NO in S31), controller 10 can proceed the process to step S33. In step S33, controller 10 can close warning dialog 55, and can terminate the process. After warning dialog 55 is closed, a screen as shown in FIG. 9 may be displayed again on display 20. When the OK button GUI in warning dialog 55 has been touched (YES in S31), controller 10 can proceed the process to step S32. In step S32, controller 10 can disconnect the phone call, and can terminate the process.

The area other than warning dialog 55 in touch panel 51 may include a Back key to be operated to return to a previous screen, a Home key to be operated to return to a home screen, and a Recent key by which a history of used applications is displayed.

Warning dialog 55 may be displayed until the OK button GUI or the CANCEL button GUI in warning dialog 55 is touched. In that case, even if an area other than warning dialog 55 is touched, warning dialog 55 does not need to be closed.

Figure 12:
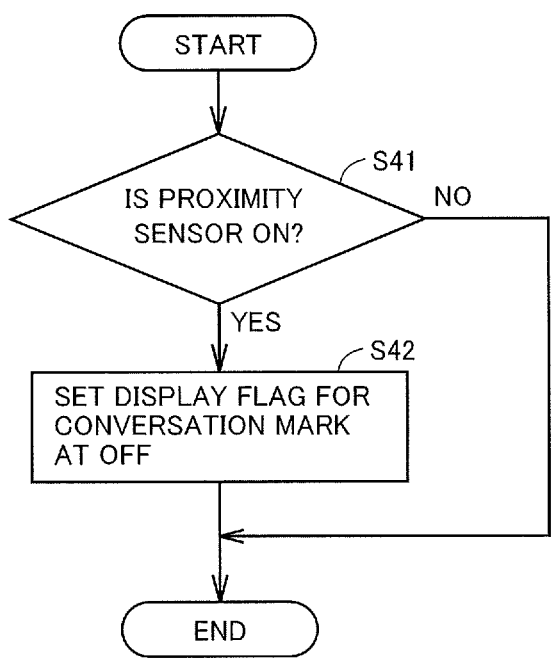
FIG. 12 shows an example of a flowchart for describing a process for determining whether or not a user has answered a resumed conversation.

FIG. 12 shows an example of a flowchart for describing a process for determining whether or not a user has answered a resumed conversation. This process may be performed at predetermined intervals while conversation mark 54 is being displayed. In step S41, controller 10 can determine whether or not proximity sensor 60 shown in FIG. 2 is detecting an object. When proximity sensor 60 is detecting an object (YES in S41), controller 10 can proceed the process to step S42. When proximity sensor 60 is detecting no object (NO in S41), controller 10 can terminate the process.

In the process shown in FIG. 12, it may be determined in step S41 whether or not the user has answered the resumed conversation. When it is detected that the user has answered the resumed conversation, the display flag for conversation mark 54 may be set at OFF. Busy mark 54 may be hidden when the process of FIG. 5 is performed after the display flag is set at OFF, and the notice that the conversation has been resumed may be stopped.

Figure 13:
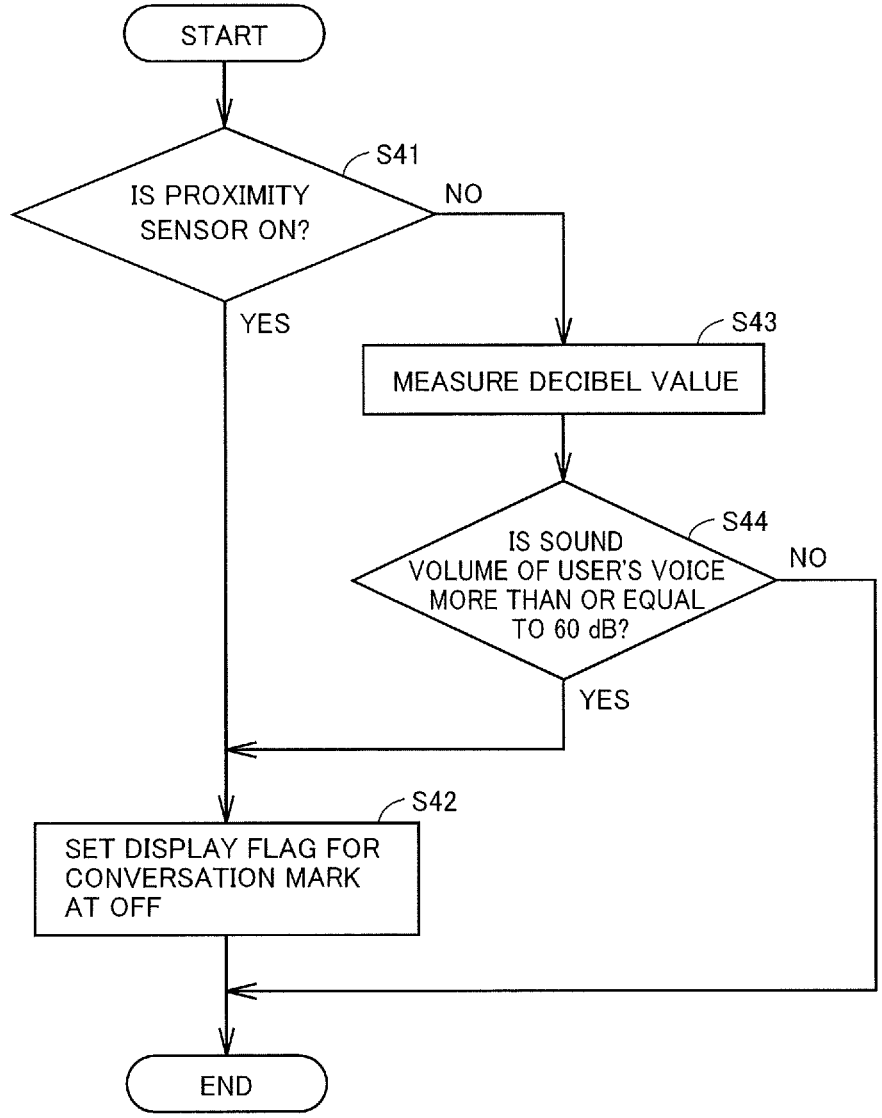
FIG. 13 shows an example of a flowchart for describing another process for determining whether or not a user has answered a resumed conversation.

The method of determining whether or not the user has answered the resumed conversation is not limited to the method of determining by step S41 shown in FIG. 12. For example, as shown in steps S43 and S44 in FIG. 13, user's voice may be measured during a predetermined time period (S43), and when the sound volume of the user's voice is more than or equal to a predetermined sound volume (YES in S44), it may be determined that the user has answered the resumed conversation. By adopting a determination method without using a proximity sensor, it can be determined whether or not the user has answered the resumed conversation even in a case where it is difficult or impossible to use a proximity sensor to make a determination. The case where it is difficult or impossible to use a proximity sensor to make a determination can include, for example, a case where a user has answered a conversation bringing microphone 70 close to his/her mouth without bringing speaker 80 shown in FIG. 1 close to his/her ear, a case where proximity sensor 60 is out of order, and a case where a smartphone according to an embodiment does not include a proximity sensor. When a smartphone according to an embodiment does not include a proximity sensor, controller 10 does not perform the processing of step S41, but may measure the decibel value of user's voice while conversation mark 54 is being displayed to determine whether or not the sound volume of the user's voice is more than or equal to the predetermined sound volume.

Smartphone 1 which is an electronic apparatus according to an embodiment of the present disclosure can detect that a conversation has been resumed. It is easier to make a user aware that the conversation has been resumed.

In an embodiment, the resumption of the conversation may be notified by displaying the conversation mark which is a predetermined image. Notifying the resumption of the conversation is not limited to displaying a predetermined image. The resumption of the conversation may be notified by, for example, increasing the sound volume of speaker 80, producing vibration, flashing a lamp not shown, or outputting predetermined sound from speaker 80.

Figure 14:
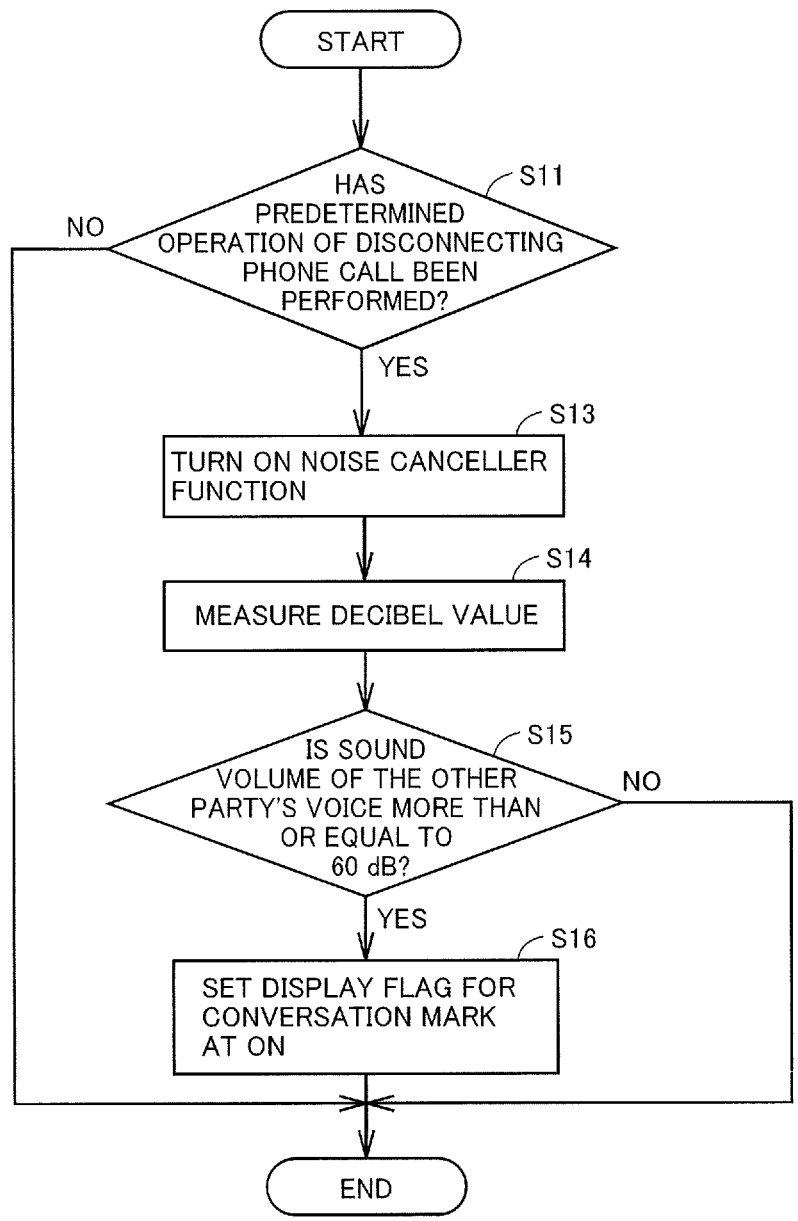
FIG. 14 shows an example of a flowchart for describing a variation of a process conducted by the controller shown in FIG. 2 for determining whether or not a conversation has been terminated.
Figure 15:
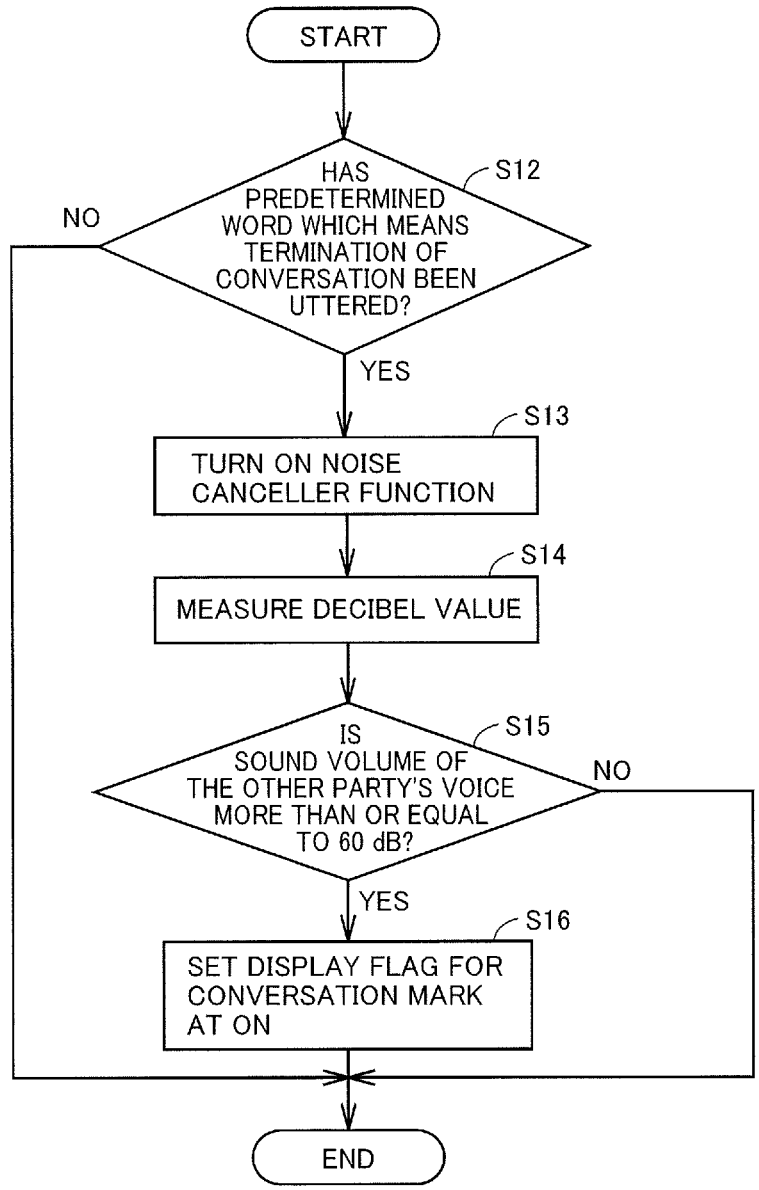
FIG. 15 shows an example of a flowchart for describing another variation of a process conducted by the controller shown in FIG. 2 for determining whether or not a conversation has been terminated.

The above embodiment describes the case of determining whether or not a conversation has been terminated by performing steps S11 and S12 shown in FIG. 4. Whether or not a conversation has been terminated may be determined by performing either one of step S11 (see FIG. 14) and step S12 (see FIG. 15).

Figure 16:
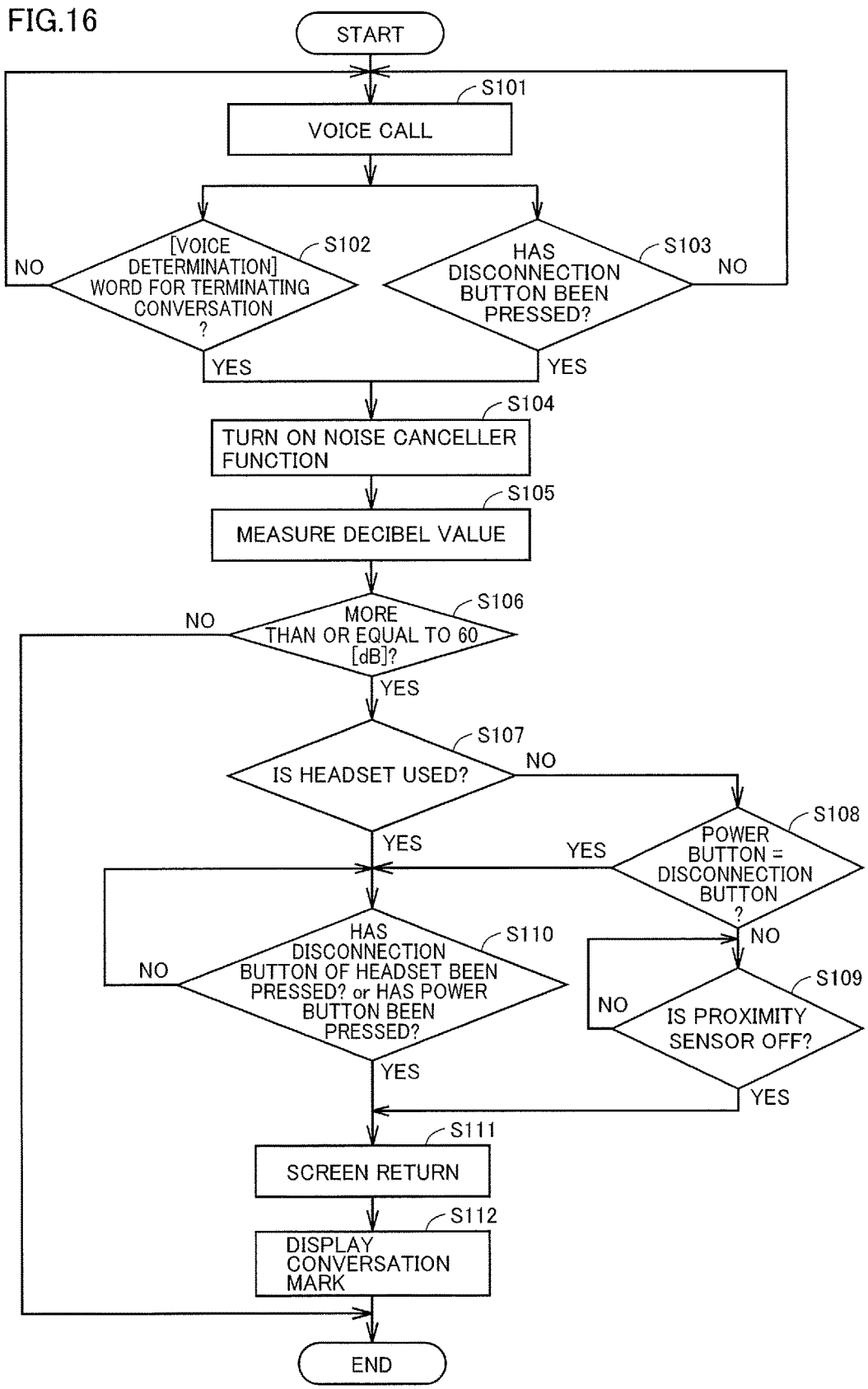
FIG. 16 shows an example of a flow of a characteristic process according to the present disclosure summarized in a single flowchart.

FIG. 16 shows an example of a flow of a characteristic process according to the present disclosure summarized in a single flowchart. With the flow of the process as shown in FIG. 16, effects similar to those of the above-described embodiment can also be achieved. The processing from steps S101 to S106 corresponds to the process shown in FIG. 4. After step S107, a flow of the process until the conversation mark is displayed (S112) differs depending on whether or not a user is using a headset. When the user is using the headset (YES in S107), the conversation mark may be displayed at a timing when the disconnection button of the headset is pressed to cause screen return (S110, S111, S112). When the user is not using the headset (NO in S107), the conversation mark may be displayed at a timing when screen return is performed (S111, S112) after the power button also serving as the disconnection button is pressed (S108, S110), or after the proximity sensor is turned off (S109).

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. An electronic apparatus by which a phone call can be made, the electronic apparatus comprising:
a communication unit configured to transmit an audio signal of a user to another party of the phone call and to receive an audio signal from the other party of the phone call;
an input unit configured to allow the user to perform an input for operating the electronic apparatus; and
at least one processor configured to determine whether or not a conversation held in the phone call has been terminated based on at least one of the audio signal transmitted or received by the communication unit during the phone call and an operation of disconnecting the phone call performed through the input unit,
the at least one processor being configured to determine whether or not the conversation has been resumed based on the audio signal received by the communication unit from the other party of the phone call after determining that the conversation has been terminated, wherein the at least one processor is configured to notify the user that the conversation has been resumed, and wherein the at least one processor is configured to cause the display to display a predetermined image to notify the user that the conversation has been resumed.

2. The electronic apparatus according to claim 1, wherein the display is configured to display one or more GUIs (Graphical User Interfaces) for operating the electronic apparatus,
the input unit includes a touch panel configured to receive a touch operation to the one or more GUIs, and
when determining that the conversation has been resumed, the at least one processor is configured to cause the predetermined image to be displayed in a display area for a predetermined GUI for disconnecting the phone call among the one or more GUIs.

3. The electronic apparatus according to claim 2, wherein the at least one processor is configured to cause the predetermined GUI to be displayed on a reduced scale so as to fit within an area where the predetermined image is not displayed in the display area.

4. The electronic apparatus according to claim 1, further comprising a proximity sensor configured to detect an object adjacent to the electronic apparatus, wherein
the at least one processor is configured to cause the predetermined image to be displayed after the proximity sensor no longer detects an object.

5. The electronic apparatus according to claim 1, further comprising a proximity sensor configured to detect an object adjacent to the electronic apparatus, wherein
the at least one processor is configured to stop notifying that the conversation has been resumed, after the proximity sensor detects the object adjacent to the electronic apparatus.

6. The electronic apparatus according to claim 1, wherein the at least one processor is configured to determine that the conversation has been resumed when the sound volume of the audio signal of the other party of the phone call is larger than a predetermined sound volume.

7. The electronic apparatus according to claim 6, wherein the at least one processor is configured to determine whether or not the conversation has been resumed using the sound volume of a signal in a predetermined frequency band included in the audio signal received from the other party of the phone call.

8. The electronic apparatus according to claim 1, further comprising a memory configured to register therein one or more termination words to be used when the at least one processor determines whether or not the conversation has been terminated, wherein
the at least one processor is configured to determine that the conversation has been terminated when one of the audio signal of the user transmitted from the communication unit and the audio signal received by the communication unit from the other party of the phone call includes at least one of the one or more termination words registered in the memory.

9. The electronic apparatus according to claim 8, wherein the at least one processor is configured to register in the memory, as the one or more termination words, a predetermined number of words uttered at a time close to a time when the phone call is disconnected among words uttered by one of the user and the other party of the phone call during the conversation.

10. The electronic apparatus according to claim 1, wherein, when the user performs a predetermined operation of disconnecting the phone call after it is determined that the conversation has been resumed, the at least one processor is configured to notify the user that the conversation has been resumed without disconnecting the phone call.

* * * * *